(No Model.)

G. COULON.
BOLT LOCK.

No. 474,444. Patented May 10, 1892.

Witnesses
J. M. Fowler
Thomas Durant

Inventor
By George Coulon,
Church & Church
His Attorneys

UNITED STATES PATENT OFFICE.

GEORGES COULON, OF PARIS, FRANCE.

BOLT-LOCK.

SPECIFICATION forming part of Letters Patent No. 474,444, dated May 10, 1892.

Application filed January 13, 1892. Serial No. 417,948. (No model.) Patented in England September 17, 1890, No. 14,718.

*To all whom it may concern:*

Be it known that I, GEORGES COULON, a citizen of the Republic of France, residing at Paris, France, have invented certain new and useful Improvements in or Relating to Bolts, (for which I have obtained Letters Patent of Great Britain, No. 14,718, dated September 17, 1890,) of which the following is a specification.

In my United States patent, No. 394,098, dated December 4, 1888, I described a form of bolt with conical recesses and wedges and without screw-threads and requiring no nuts as being especially intended for use in securing the metals of railways. For this special purpose I had combined with the wedging devices proper — namely, the bolt and the wedge—a fish-plate provided with a longitudinal groove for the reception of the wedge. Extensive practical experience has since enabled me considerably to extend the scope of the application of that invention and my improved bolt has now become applicable to the junction of pieces of machinery and other objects. Where such pieces may not be provided with a groove, I have supplemented my bolt by a small plate or washer carrying the groove for the reception and operation of the wedge upon its upper surface, the said groove being essential for properly tightening the wedge. The form of this groove had to be determined with particular care, and by numerous experiments, I have been led to devise two arrangements, which I shall now proceed to describe with reference to the accompanying drawings, in which—

Figure 2:
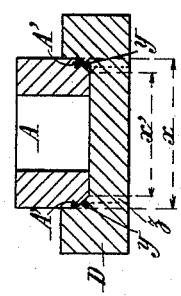
Figure 3:
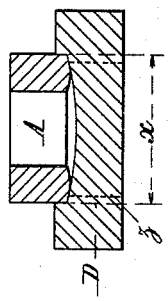
Figure 1:
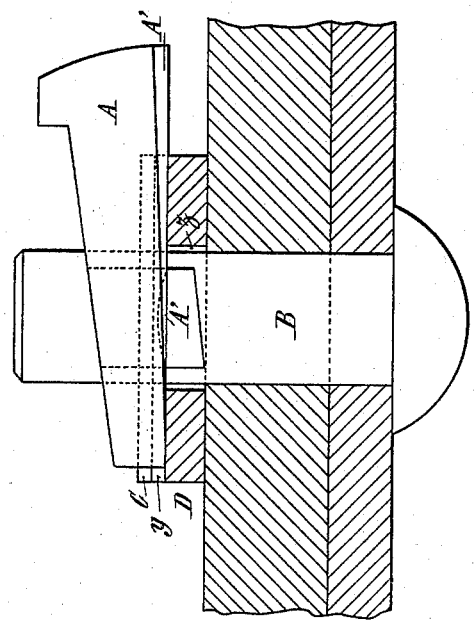
Figure 4:

Figure 1 shows by way of example a section of two pieces unprovided with grooves joined by means of my improved bolt and wedge, combined with or supplemented by a grooved washer or plate. Fig. 2 shows in cross-section a special form or groove which may either exist in the pieces themselves which are to be connected—such as fish-plates—or in the auxiliary plate or washer. Fig. 3 illustrates also in cross-section a modified form of groove. Fig. 4 is a detail view of the bolt.

The groove C, no matter whether it is formed in a removable plate or washer D, Fig. 1, or in one of the parts to be connected, (as is the case in railway fish-plates,) not only prevents the arms or branches of the wedge A from spreading asunder, but powerfully assists the easy, uniform, and direct or tight fitting of the said branches or arms against the bearing-surfaces of the bolt B.

In the first arrangement shown in Fig. 2 the upper portion $x$ of the groove C is equal to the width of the wedge A, while the lower portion $x'$ is formed with inclines $y$, each being the hypotenuse of a right-angled triangle which extends beyond the opening $z$ of the washer or of one of the parts to be connected, as the case may be. When, therefore, the wedge A is inserted into the groove, its arms, provided at their lower external edges with a bevel A′, which extends from the head of the wedge and terminates in a point a short distance from the opposite end of the wedge, will of their own accord move up against and tightly grasp the reduced portion of the bolt, this action being perfectly uniform and reliable, the lower surface of the branches being in no way damaged by the cutting action of the edge of the opening when the groove is plane. Practically the same result is obtained by means of a slightly-concave groove, to fit which the branches or arms of the wedge or key are correspondingly rounded off, as illstrated by Fig. 3.

I claim—

1. In a bolt-lock, the combination, with the bolt having parallel slots in its sides near its end and a divided wedge co-operating therewith, of the base-plate or washer provided with a groove having the bottom surfaces thereof inclined away from the axis of the bolt, into which groove the divided wedge is adapted to fit, substantially as described.

2. In a bolt-lock, the combination, with the bolt having parallel slots in its sides near its end and a divided wedge co-operating therewith, the lower edges of the arms of the wedge being beveled for a portion of their length, of the base-plate or washer provided with a groove having beveled corners for the reception of the divided wedge, substantially as described.

In testimony whereof I have hereunto subscribed my hand in the presence of two subscribing witnesses.

GEORGES COULON.

Witnesses:
JEAN ROBELET,
WILSON P. BOYD.